United States Patent
Iyori et al.

(10) Patent No.: US 6,436,572 B1
(45) Date of Patent: Aug. 20, 2002

(54) NEGATIVE ELECTRODE FOR NONAQUEOUS ELECTROLYTE SECONDARY BATTERY AND NONAQUEOUS ELECTROLYTE SECONDARY BATTERY HAVING THE NEGATIVE ELECTRODE

(75) Inventors: Masahiro Iyori, Hirakata; Masahisa Fujimoto, Osaka; Shin Fujitani; Koji Nishio, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/494,427

(22) Filed: Jan. 31, 2000

(30) Foreign Application Priority Data

Jan. 29, 1999 (JP) ............................................. 11-022657

(51) Int. Cl.[7] .......................... H01M 4/46; H01M 4/58; H01M 4/60
(52) U.S. Cl. .................. 429/213; 429/218.1; 429/231.8
(58) Field of Search ................................ 429/212, 213, 429/218.1, 231.8

(56) References Cited

U.S. PATENT DOCUMENTS 4,886,572 A * 12/1989 Kimura et al.
5,482,797 A * 1/1996 Yamada et al.

FOREIGN PATENT DOCUMENTS

| JP | 63-158745 A | 7/1988 |
| JP | 3-297072 A | 12/1991 |
| JP | 4-162372 A | 6/1992 |
| JP | 10-321226 | * 12/1998 |

* cited by examiner

*Primary Examiner*—Gabrielle Brouillette
*Assistant Examiner*—Jonathan Crepeau
(74) *Attorney, Agent, or Firm*—Kubovcik & Kubovcik

(57) ABSTRACT

A negative electrode for a nonaqueous electrolyte secondary battery and a nonaqueous electrolyte secondary battery including the negative electrode. The negative electrode is made from aluminum powder or aluminum alloy powder coated with carbon and a conductive polymer. Since aluminum or aluminum alloy has a theoretical maximum capacity as high as 1200 mAh/g, a battery having aluminum or aluminum alloy as the negative electrode material has a high capacity.

16 Claims, No Drawings

NEGATIVE ELECTRODE FOR NONAQUEOUS ELECTROLYTE SECONDARY BATTERY AND NONAQUEOUS ELECTROLYTE SECONDARY BATTERY HAVING THE NEGATIVE ELECTRODE

FIELD OF THE INVENTION

The present invention relates to a negative electrode for a nonaqueous electrolyte secondary battery having a positive electrode and a negative electrode which is capable of occluding and discharging lithium electrochemically, a separator which separates said electrodes from each other and a nonaqueous electrolyte, and to a nonaqueous electrolyte secondary battery. Specifically, the present invention relates to an improvement in the storage property and discharge capacity of the negative electrode and the nonaqueous electrolyte secondary battery.

BACKGROUND OF THE INVENTION

A lithium secondary battery represented by a lithium ion battery containing a positive electrode material which is a lithium containing transition metal oxide composite, for example, lithium-cobalt oxide composite ($LiCoO_2$), lithium-nickel oxide composite ($LiNiO_2$), lithium-manganese oxide composite, and the like, and a negative electrode material containing lithium metal, a lithium alloy or a carbon material which is capable of occluding and discharging lithium ion has lately been attracting attention for a battery for portable electronic communication equipment, for example, compact video cameras, cell phones, notebook computers and the like. A lithium secondary battery which has a carbon material as a negative electrode material has actually been used.

When a carbon material is used as the negative electrode material, a maximum capacity of a battery is theoretically 372 mAh/g. Various materials have been tried to increase the capacity. Aluminum and aluminum alloys have lately attracted attention as an alternative to a carbon material because they have a theoretical maximum capacity of 1200 mAh/g.

However, particle size of aluminum and aluminum alloys is reduced by repeated occluding and discharging of lithium ion during charge and discharge cycles and charge-discharge cycle is shortened. Japanese patent publication (Laid-open) Sho 62-100942 discloses that a composition comprising a uniform mixture of alkali metal or alkali metal alloy and a conductive polymer is used for a negative electrode to improve discharge capacity and life cycle. However, this attempt cannot provide sufficient improvement.

Objects of the present invention are to decrease the reduction of particle size which accompanies charge and discharge of aluminum or aluminum alloy, to increase discharge capacity and to obtain a nonaqueous electrolyte secondary battery having a cycle property.

SUMMARY OF THE INVENTION

The present invention provides a negative electrode consisting essentially of aluminum powder or aluminum alloy powder coated with carbon and a conductive polymer. A binder is used to adhere the coated particles together. Since aluminum or aluminum alloy has a theoretical maximum capacity as high as 1200 mAh/g, a battery having aluminum or aluminum alloy as a negative electrode material can have a high capacity.

Carbon and the conductive polymer coating formed on the surface of the aluminum powder or aluminum alloy powder prevent particle size reduction of the powder because the carbon and/or conductive polymer is adhered with a binder and maintains the powder particles strongly together. Therefore, even when charge-discharge cycles are repeated, an excellent cycle property of the battery can be maintained.

A conductive network among particles is created by the carbon and conductive polymer and conductivity is maintained to increase availability of the active material and to obtain a high capacity of the battery. Discharge capacity of the battery is not reduced even when the carbon and conductive polymer are coated on the surface of an aluminum powder or an aluminum alloy powder because the carbon and conductive polymer are capable of occluding or discharging lithium ion.

Preferred as the carbon which forms a coating on the surface of the aluminum powder or aluminum alloy powder is one having a d-value of the lattice plane (002) of not more than 3.50 Å and a size of crystal lattice in a direction of c axis (Lc) of greater than or equal to 13 Å. Preferred as the conductive polymer which forms a coating on the surface of the aluminum powder or aluminum alloy powder are polythiophene, polyaniline and polypyrrole. These carbons and conductive polymers can occlude or discharge lithium ion well.

Preferably, the amount of the aluminum powder or the aluminum alloy powder is at least 25 weight % and not more than 80 weight % of the total weight of the negative electrode, the amount of the carbon is at least 5 weight % and not more than 50 weight % of the total weight of the negative electrode and the amount of the conductive polymer is at least 5 weight % and not more than 50 weight % of the total weight of the negative electrode. If an excessive amount of the carbon and the conductive polymer is used, discharge capacity is reduced and if the amount of the carbon and the conductive polymer is not sufficient, particles of the aluminum and aluminum alloy powder are not strongly adhered.

If the median diameter of the aluminum powder or the aluminum alloy powder is larger than 30 μm, it is difficult to mix the powder with other components and the electrode reaction is not uniform. On the other hand, if the median diameter of the aluminum powder or the aluminum alloy powder is smaller than 5 μm, the disadvantages of a reduction of particle size easily result. Therefore, the preferable median diameter of the aluminum powder or the aluminum alloy powder is 5–30 μm.

The amount of the binder is an amount sufficient to adhere the coated particles together and is generally an amount of up to about 1% by weight of the negative electrode material.

As an active positive electrode material, there can be used a lithium-containing transition metal composite oxide composite, for example, lithium-cobalt oxide ($LiCoO_2$), lithium-nickel oxide ($LiNiO_2$), lithium-manganese oxide ($LiMn_2O_4$), lithium-iron oxide ($LiFeO_2$), and the like.

As a solvent of the nonaqueous electrolyte, an aprotic solvent, for example, ethylene carbonate (EC), propylene carbonate, butylene carbonate, dimethyl carbonate, diethyl carbonate (DEC), ethyl methyl carbonate (EMC) and the like can be used alone or in the form of a mixture of two or more of these substances can be used. A preferred solvent is a mixture of EC and at least one solvent selected from DEC, DMC and EMC in a ratio of EC to the other solvent(s) of 5:95~60:40 by volume.

As a solute dissolved in the solvent there can be mentioned $LiPF_6$, $LiBF_4$, $LiClO_4$, $LiCF_3SO_3$, $LiAsF_6$, $LiN(SO_2C_2F_6)_2$ $LiN(CF_3SO_2)_2$ $LiCF_3(CF_2)_3SO_3$ and the like.

There is not any limitation with respect to the size and shape of a battery of the present invention. It can be thin or regular. It also can be in the shape of a prism, a cylinder or a coin.

DESCRIPTION OF PREFERRED EMBODIMENT

The present invention is described below in detail in conjunction with certain examples. However, it is of course understood that the present invention is not limited to the following examples. The present invention can be modified within the scope and spirit of the appended claims.

EXAMPLE 1

[Preparation of Negative Electrode]

50 Parts by weight of aluminum powder having a median diameter of 10 μm, 25 parts by weight of a natural graphite having a $d_{002}$ of 35 Å and an Lc of more than 1000 Å (Kansai Netsukagaku Kabushikikaisha, NG12) and 25 parts by weight of polyaniline were mixed to obtain a negative electrode material.

Styrene-butadiene rubber (SBR) contained in N-methyl-2-pyrrolidone (NMP) was added to the negative electrode material to prepare a slurry. The ratio of the negative electrode material to the NMP was about 1:2 by weight. The amount of SBR, which is a binder for the negative electrode material, was 1 weight % of the weight of the slurry. The slurry was coated onto both sides of a copper foil as a negative electrode collector, and the copper foil coated with the slurry was heated at 100° C. for two hours. The graphite adhered onto the surface of the aluminum powder by the SBR during heat treatment. The negative electrode material adhered closely to the copper foil and formed the negative electrode.

[Preparation of Positive Electrode]

90 Parts by weight of lithium-cobalt oxide ($LiCoO_2$), 6 parts by weight acetylene black as a conductive agent and 4 parts by weight of polyfluorovinylidene as a binder were mixed to prepare a positive electrode material. NMP was added to the positive electrode material to prepare a slurry. The slurry was coated on both sides of an aluminum foil (positive electrode collector), and the coated foil was heated at 100° C. for two hours.

[Preparation of Electrolyte]

$LiPF_6$ as a solute was dissolved in a 1:1 by volume mixture of ethylene carbonate (EC) and dimethyl carbonate (DMC) at a concentration of 1 mol/l to prepare a nonaqueous electrolyte.

[Preparation of Lithium Secondary Battery]

A negative lead and a positive lead were connected to the negative electrode and the positive electrode, respectively. The positive electrode and the negative electrode were rolled and spirally wound via a separator made of polypropylene, and housed in a positive can and a negative can, respectively (a can has a diameter of 18 mm and a height of 65 mm). Each lead was connected to a positive terminal or a negative terminal. The nonaqueous electrolyte was injected into the can and was sealed to prepare a battery having a standard capacity of 580 mAH.

Comparative Example 1

1 Weight % of styrene-butadiene rubber (SBR) as a binder and N-methyl-2-pyrrolidone were added to aluminum powder having a median diameter of 10 μm to prepare a slurry. Then the slurry was coated onto both sides of a copper foil as a negative electrode collector, and the copper foil coated with the slurry was heated at 100° C. for two hours to prepare a negative electrode for the battery of Comparative Example 1.

Comparative Example 2

95 Parts by weight of natural graphite (Kansai Netsukagaku Kabushikikaisha, NG12) and 5 parts by weight of polyfluorovinylidene were mixed to make a negative electrode material. NMP was added to the negative electrode material to prepare a slurry. Then the slurry was coated onto both sides of a copper foil as a negative electrode collector, and the copper foil coated with the slurry was heated at 100° C. for two hours to prepare a negative electrode for the battery of Comparative Example 2.

[Charge-discharge Cycle Test]

Each battery was constantly charged to 4.1 V at a charging current of 200 mA at 25° C., and constantly discharged to 2.75 V at a discharging current of 200 mA (this cycle was considered as one cycle). A discharge capacity after the first cycle (initial discharge capacity) and one after 500 cycles were measured. The remaining capacity, which is a percentage of the discharge capacity after 500 cycles to the initial discharge capacity, was calculated. Results are shown in Table 1.

TABLE 1

| Battery | Initial Capacity | Remaining Capacity (%) |
|---|---|---|
| Example 1 | 2300 | 90 |
| Comparative Example 1 | 2000 | 0 |
| Comparative Example 2 | 1500 | 85 |

Batteries of Example 1 and Comparative Example 1 which have aluminum powder as an active negative electrode material have a large initial capacity. The battery of Comparative Example 2 having graphite as an active negative electrode has a smaller initial capacity as compared to these batteries as shown in Table 1.

Although the battery of Comparative Example 1 has a large initial capacity, the battery does not have any remaining capacity after 500 cycles. Actually, the battery lost capacity only after 20~30 cycles.

The battery of the present invention has both a large initial capacity and an excellent remaining capacity. This result shows that size reduction of aluminum powder is inhibited in the present invention and cycle property is improved.

[Research of Carbon Materials]

Carbon materials used for coating the surface of the aluminum and aluminum powders were researched.

EXAMPLE 2

A battery was prepared in the same manner as Example 1 except that petroleum coke (Mitsubishi Chemical; M coke: $d_{002}$=3.44 Å and Lc=32 Å) was used instead of natural graphite.

EXAMPLE 3

A battery was prepared in the same manner as Example 1 except that carbon black (Mitsubishi Chemical; MA100: $d_{002}$=3.50 Å and Lc=13.5 Å) was used instead of natural graphite.

Comparative Example 3

A battery was prepared in the same manner as Example 1 except that acetylene black ($d_{002}$=3.48 Å and Lc=12 Å) was used instead of natural graphite.

Cycle testing was conducted as explained above. The results are shown in Table 2.

TABLE 2

| Battery | $d_{002}$ (Å) | Lc (Å) | Initial Capacity | Remaining Capacity (%) |
|---|---|---|---|---|
| Example 1 | 3.35 | 1000 | 2300 | 90 |
| Example 2 | 3.44 | 32 | 2200 | 87 |
| Example 3 | 3.50 | 13.5 | 2100 | 85 |
| Comparative Example 3 | 3.48 | 12 | 1800 | 70 |

Batteries of Example 1, 2 and 3 have larger initial capacity and better remaining capacity as compared to the battery of Comparative Example 3. Carbon material having a $d_{002}$ of not more than 3.50 and an Lc of greater than 13 Å is required for the present invention.

[Research of Conductive Materials]

Various conductive materials were researched to find suitable materials for the present invention.

EXAMPLE 4

A battery was prepared in the same manner as Example 1 except that polythiohene was used instead of polyaniline.

EXAMPLE 5

A battery was prepared in the same manner as Example 1 except that polypyrrole was used instead of polyaniline.

Cycle testing was conducted as explained above. The results are shown in Table 3.

TABLE 3

| Battery | Conductive Polymer | Initial Capacity | Remaining Capacity (%) |
|---|---|---|---|
| Example 1 | polyaniline | 2300 | 90 |
| Example 4 | polythiohene | 2150 | 85 |
| Example 5 | polypyrrole | 2010 | 85 |

The batteries of Examples 1, 4 and 5 have similar properties, i.e., all have large initial capacity and excellent remaining capacity. Therefore, polyaniline, polythiohene and polypyrrole are suitable as a conductive polymer for the negative electrode and battery of the present invention. Polyaniline is the most preferable.

[Mixing Ratio of Components of Negative Electrode Material]

Mixing ratio of the components of the negative electrode material was researched.

EXAMPLES 6~14

Negative electrode materials were prepared using ratios of the components as shown in Table 4. Batteries-were prepared in the same manner as Example 1 except that the different negative electrode materials were used.

Comparative Examples 4 and 5

Negative electrode materials were prepared using ratios of components as shown in Table 4. Batteries were prepared in the same manner as Example 1 except that the different negative electrode materials were used.

Cycle testing was conducted as explained above. The results are shown in Table 4.

TABLE 4

| | Mixing Ratio of Negative Electrode material | | | | Remaining |
|---|---|---|---|---|---|
| Battery | Al powder | Natural Graphite | Poly-aniline | Initial Capacity | Capacity (%) |
| Example 1 | 50 | 25 | 25 | 2300 | 90 |
| Example 6 | 75 | 5 | 20 | 2250 | 86 |
| Example 7 | 75 | 20 | 5 | 2250 | 83 |
| Example 8 | 50 | 5 | 45 | 2220 | 85 |
| Example 9 | 50 | 45 | 5 | 2200 | 83 |
| Example 10 | 25 | 25 | 50 | 2150 | 90 |
| Example 11 | 25 | 50 | 25 | 2200 | 88 |
| Example 12 | 80 | 10 | 10 | 2200 | 80 |
| Example 13 | 10 | 75 | 15 | 2050 | 82 |
| Example 14 | 10 | 15 | 75 | 2050 | 87 |
| Comp. Ex. 4 | 50 | 0 | 50 | 2000 | 80 |
| Comp. Ex. 5 | 50 | 50 | 0 | 2100 | 0 |

The batteries of Examples 1 and 6~12 have large initial capacity and excellent remaining capacity.

When an aluminum alloy powder, for example, aluminum-manganese alloy powder or aluminum-copper alloy powder, is used instead of aluminum powder, similar results are obtained.

When polythiophene or polypyrrole is used as the conductive polymer and other carbon materials such as petroleum coke and carbon black are used for the coating of the aluminum or aluminum alloy powder, similar results are also obtained.

The amount of aluminum powder or aluminum alloy powder is preferably at least 25 weight % and not more than 80 weight % and, more preferably, at least 50 weight % and not more than 80 weight %. The amount of carbon is preferably at least 5 weight % and not more than 50 weight % and, more preferably, at least 25 weight % and not more than 50 weight %. The amount of the conductive polymer is preferably at least 5 weight % and not more than 50 weight %.

ADVANTAGES OF THE INVENTION

A battery of the present invention has a large capacity because aluminum powder or aluminum alloy powder is used as an active negative electrode material. The battery of the present invention can maintain a large capacity because size reduction of aluminum powder or aluminum alloy powder is prevented by the coating of carbon and conductive polymer on the surface of the powder.

What is claimed is:

1. A negative electrode for a nonaqueous electrolyte secondary battery, said negative electrode consisting essentially of particles of aluminum powder or aluminum alloy powder, the particles being coated with a mixture of carbon and a conductive polymer.

2. A negative electrode according to claim 1, wherein said carbon has a d-value of the lattice plane (002) of not more than 3.50 Å and a size of crystal lattice in a direction of c axis (Lc) of greater than or equal to 13 Å.

3. A negative electrode according to claim 1, wherein said conductive polymer is selected from the group consisting of polythiophene, polyaniline and polypyrrole.

4. A negative electrode according to claim 2, wherein said conductive polymer is selected from the group consisting of polythiophene, polyaniline and polypyrrole.

5. A negative electrode according to claim 1, wherein said negative electrode contains an amount of said aluminum powder or said aluminum alloy powder of at least 25 weight % and not more than 80 weight % based on the total weight of said negative electrode, an amount of said carbon of at least 5 weight % and not more than 50 weight % based on the total weight of said negative electrode and an amount of said conductive polymer of at least 5 weight % and not more than 50 weight % based on the total weight of said negative electrode.

6. A negative electrode according to claim 2, wherein said negative electrode contains an amount of said aluminum powder or said aluminum alloy powder of at least 25 weight % and not more than 80 weight % based on the total weight of said negative electrode, an amount of said carbon of at least 5 weight % and not more than 50 weight % based on the total weight of said negative electrode and an amount of said conductive polymer of at least 5 weight % and not more than 50 weight % based on the total weight of said negative electrode.

7. A negative electrode according to claim 1, wherein said aluminum powder or said aluminum alloy powder has a median diameter of 5~30 μm.

8. A negative electrode according to claim 2, wherein said aluminum powder or said aluminum alloy powder has a median diameter of 5~30 μm.

9. A nonaqueous electrolyte secondary battery comprising a positive electrode and a negative electrode which is capable of occluding and discharging lithium electrochemically, a separator which separates said electrodes from each other and a nonaqueous electrolyte, wherein said negative electrode consists essentially of particles of aluminum powder or aluminum alloy powder, the particles being coated with a mixture of carbon and a conductive polymer.

10. A nonaqueous electrolyte secondary battery according to claim 9, wherein said carbon has a d-value of the lattice plane (002) of not more than 3.50 Å and a size of crystal lattice in a direction of c axis (Lc) of greater than or equal to 13 Å.

11. A nonaqueous electrolyte secondary battery according to claim 9, wherein said conductive polymer is selected from the group consisting of polythiophene, polyaniline and polypyrrole.

12. A nonaqueous electrolyte secondary battery according to claim 10, wherein said conductive polymer is selected from the group consisting of polythiophene, polyaniline and polypyrrole.

13. A nonaqueous electrolyte secondary battery according to claim 9, wherein said negative electrode contains an amount of said aluminum powder or said aluminum alloy powder of at least 25 weight % and not more than 80 weight % based on the total weight of said negative electrode, an amount of said carbon of at least 5 weight % and not more than 50 weight % based on the total weight of said negative electrode and an amount of said conductive polymer of at least 5 weight % and not more than 50 weight % based on the total weight of said negative electrode.

14. A nonaqueous electrolyte secondary battery according to claim 10, wherein said negative electrode contains an amount of said aluminum powder or said aluminum alloy powder of at least 25 weight % and not more than 80 weight % based on the total weight of said negative electrode, an amount of said carbon of at least 5 weight % and not more than 50 weight % based on the total weight of said negative electrode and an amount of said conductive polymer of at least 5 weight % and not more than 50 weight % based on the total weight of said negative electrode.

15. A nonaqueous electrolyte secondary battery according to claim 9, wherein said aluminum powder or said aluminum alloy powder has a median diameter of 5~30 μm.

16. A nonaqueous electrolyte secondary battery according to claim 10, wherein said aluminum powder or said aluminum alloy powder has a median diameter of 5~30 μm.

* * * * *